United States Patent
Huang

(10) Patent No.: US 9,268,104 B2
(45) Date of Patent: Feb. 23, 2016

(54) OPTICAL FIBER CONNECTOR AND ELECTRONIC DEVICE

(71) Applicant: ASKEY COMPUTER CORP., New Taipei (TW)

(72) Inventor: Tzu-Huang Huang, Taoyuan County (TW)

(73) Assignee: ASKEY COMPUTER CORP., New Taipei (TW)

(*) Notice: Subject to any disclaimer, the term of this patent is extended or adjusted under 35 U.S.C. 154(b) by 0 days.

(21) Appl. No.: 14/541,158

(22) Filed: Nov. 14, 2014

(65) Prior Publication Data

US 2015/0153526 A1 Jun. 4, 2015

(30) Foreign Application Priority Data

Dec. 4, 2013 (TW) .............................. 102144495 A

(51) Int. Cl.
G02B 6/36 (2006.01)
G02B 6/38 (2006.01)
G02B 6/42 (2006.01)

(52) U.S. Cl.
CPC ............ *G02B 6/3897* (2013.01); *G02B 6/4201* (2013.01); *G02B 6/4204* (2013.01); *G02B 6/4246* (2013.01); *G02B 6/4277* (2013.01); *G02B 6/4292* (2013.01)

(58) Field of Classification Search
CPC .. G02B 6/4292; G02B 6/4246; G02B 6/4201; G02B 6/4204; G02B 6/4277
USPC .......................................................... 385/92
See application file for complete search history.

(56) References Cited

U.S. PATENT DOCUMENTS 5,085,494 A * 2/1992 Wesson et al. .................. 385/98
7,114,984 B2 * 10/2006 Shirk et al. ..................... 439/372

* cited by examiner

*Primary Examiner* — Jerry Blevins
(74) *Attorney, Agent, or Firm* — Jianq Chyun IP Office

(57) ABSTRACT

An electronic device including a casing, an optical fiber connector and a protecting cover is provided. The case includes an opening and a first engaging member. The optical fiber connector is disposed in the opening. The protecting cover is disposed at the opening and includes a second engaging member movably engaged with the first engaging member so that the optical fiber connector is exposed or shielded by the protecting cover. An optical fiber connector having a connecting port, a first engaging member and a protecting cover is further provided. The first engaging member is disposed besides the connecting port. A second engaging member of the protecting cover is movably disposed at the first engaging member so that the protecting cover exposes or shields the connecting port. The protecting cover is capable of fixing an optical fiber cable and shielding a light emitted from the optical fiber connector.

12 Claims, 7 Drawing Sheets

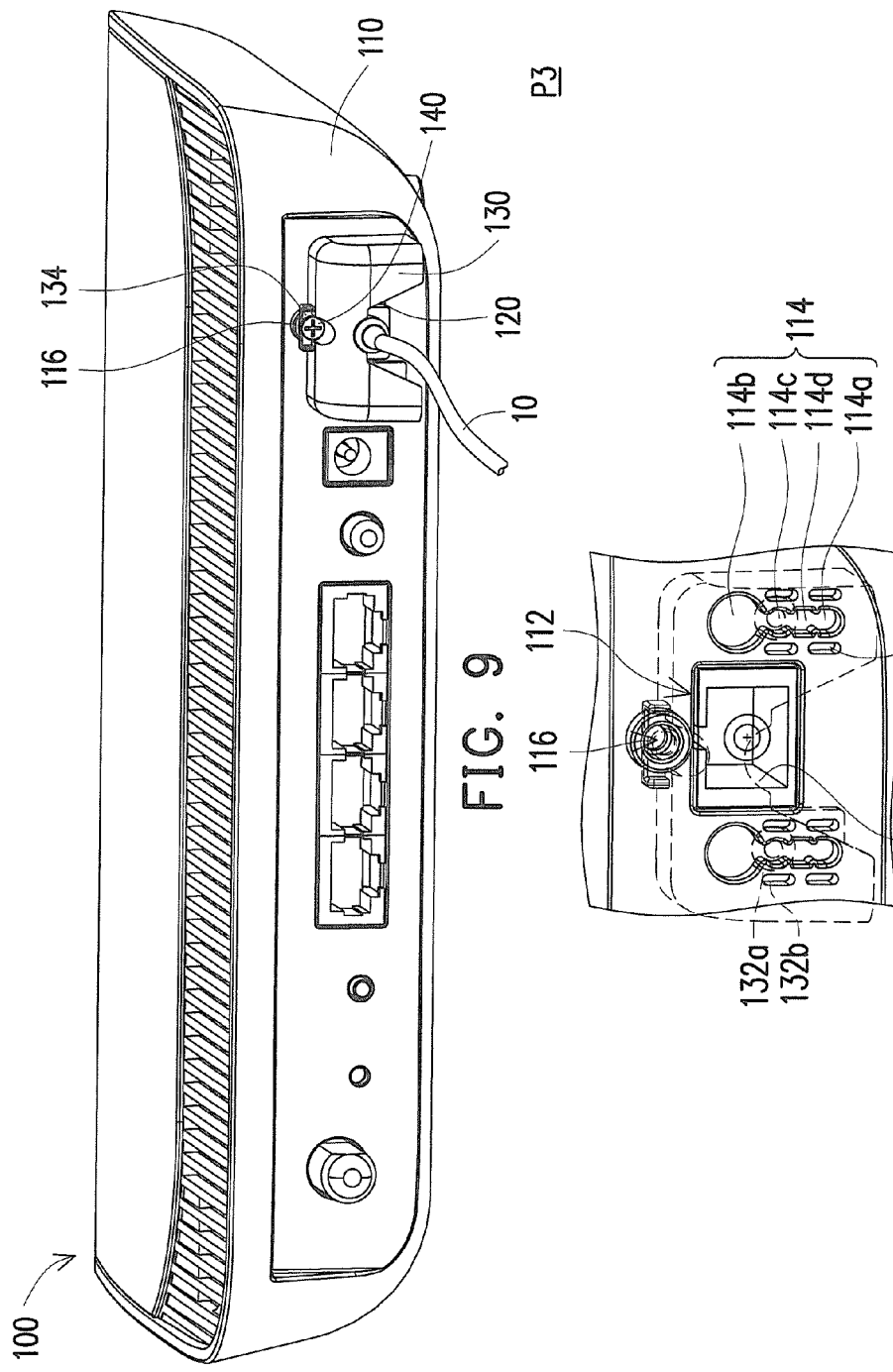

OPTICAL FIBER CONNECTOR AND ELECTRONIC DEVICE

CROSS-REFERENCE TO RELATED APPLICATION

This application claims the priority benefit of Taiwan application serial no. 102144495, filed on Dec. 4, 2013. The entirety of the above-mentioned patent application is hereby incorporated by reference herein and made a part of this specification.

BACKGROUND

1. Field of the Invention

The invention is related to an optical fiber connector and an electronic device and more particularly, to an optical fiber connector and an electronic device with a protecting cover for the optical fiber connector.

2. Description of Related Art

When a commercially available optical fiber router is connected with power, an optical fiber connector emits light; however, the light with high brightness may probably cause harm to eyes if a person gazes at the light emitted from the optical fiber connector. At present, when the optical fiber connector is not in use (i.e., the optical fiber connector is not connected with an optical fiber cable), a dedicated plug or plastic cover is inserted therein to shield an opening of the optical fiber connector to shield the light. However, the plug or plastic cover has to be detached every time when the optical fiber cable is to be plugged in, while the electronic device itself has no place or space dedicated for accommodating the plug or plastic cover, which leads to high risk of mislaying the plug or plastic cover. Moreover, the currently available optical fiber connector is fixed with the optical fiber cable only through the connection with the optical fiber cable, such that the optical fiber cable is easily detached and cannot be fixed securely.

SUMMARY

The invention provides an electronic device having a protecting cover movably fixed to an optical fiber connector without being removed, where the protecting cover can shield a light emitted from the optical fiber connector and be used to fix the optical fiber cable when the optical fiber cable is not yet inserted into a connecting port of the optical fiber connector.

The invention is directed to an electronic device including a casing, an optical fiber connector and a protecting cover. The casing includes an opening and a first engaging member. The optical fiber connector is disposed in the opening, and the first engaging member is disposed adjacent to the opening. The protecting cover includes a second engaging member movably engaged with the first engaging member. When moving along the first engaging member, the protecting cover exposes or shields the optical fiber connector.

In an embodiment of the invention, the first engaging member is a rail, and the second engaging member is a guiding post extending into the rail. The first engaging member includes a first section and a second section. When the second engaging member is located in the first section, the protecting cover shields the optical fiber connector, and when the second engaging member is located in the second section, the protecting cover exposes the optical fiber connector.

In an embodiment of the invention, the first engaging member further includes a third section located between the first section and the second section. When an optical fiber cable is inserted into the connecting port of the optical fiber connector, the second engaging member is adapted to be located in the third section, and part of the optical fiber cable is located between the optical fiber connector and the protecting cover.

In an embodiment of the invention, the second engaging member includes an end portion and a body. A diameter of the second section is greater than a diameter of the end portion, the diameter of the end portion is greater than a diameter of the first section and greater than a diameter of the third section, and the diameters of the first section and the third section are greater than a diameter of the body.

In an embodiment of the invention, the electronic device further includes a first fixing member, the casing further includes a second fixing member, and the protecting cover includes a through hole. When the second engaging member is located in the third section, the first fixing member passes through the through hole to be fixed to the second fixing member.

In an embodiment of the invention, the casing further includes a buffer hole disposed besides the first engaging member.

The invention is directed to an optical fiber connector, including a connecting port, a first engaging member and a protecting cover. The connecting port is used for an optical fiber cable to be inserted in. The first engaging member is located besides the connecting port. The protecting cover includes a second engaging member movably engaged with the first engaging member, and the protecting cover exposes or shields the connecting port when moving along the first engaging member.

In an embodiment of the invention, the first engaging member is a rail; the second engaging member is a guiding post extending into the rail. The first engaging member includes a first section and a second section. When the second engaging member is located in the first section, the protecting cover shields the optical fiber connector, and when the second engaging member is located in the second section, the protecting cover exposes the optical fiber connector.

In an embodiment of the invention, the first engaging member further includes a third section located between the first section and the second section. When an optical fiber cable is inserted into the connecting port of the optical fiber connector, the second engaging member is adapted to be located in the third section, and part of the optical fiber cable is located between the optical fiber connector and the protecting cover.

In an embodiment of the invention, the second engaging member includes an end portion and a body. A diameter of the second section is greater than a diameter of the end portion, the diameter of the end portion is greater than a diameter of the first section and greater than a diameter of the third section, and the diameters of the first section and the third section are greater than a diameter of the body.

In an embodiment of the invention, the optical fiber connector further includes a first fixing member, and the fiber connector further comprising a second fixing member, and the protecting cover comprising a through hole, wherein when the second engaging member is located in the third section, the first fixing member passes through the through hole to be fixed to the second fixing member.

In an embodiment of the invention, the optical fiber connector further includes a buffer hole disposed besides the first engaging member.

Based on the above, in the electronic device of the invention, the first engaging member is disposed on the casing and the protecting cover can be movably engaged with the first engaging member through the second engaging member, such that the protecting cover moves relatively to the optical fiber connector. In a scenario that the optical fiber cable is not yet inserted into the connecting port of the optical fiber connector, the second engaging member may be located in the first section of the first engaging member (i.e., the protecting cover is located at a first position relative to the optical fiber connector). In this case, the protecting cover shields the connecting port of the optical fiber connector to prevent a user from viewing the light which is emitted from the optical fiber connector. When the optical fiber cable is to be inserted into the connecting port of the optical fiber connector, only the second engaging member of the protecting cover has to be moved to the second section of the first engaging member, without detaching the protecting cover (i.e., the protecting cover is located at a second position related to the optical fiber connector), such that protecting cover exposes the optical fiber connector for inserting the optical fiber cable. Thereafter, the user may move the second engaging member of the protecting cover to the third section of the first engaging member (i.e., the protecting cover is located at a third position related to the optical fiber connector). In this case, part of the optical fiber cable is located between the optical fiber connector and the protecting cover. That is, the protecting cover interferes the optical fiber cable, such that the optical fiber cable is incapable of moving in a direction departing from the connecting port. Moreover, in the electronic device of the invention, the first fixing member, such as a screw, passes through the through hole of the protecting cover to be fixed to the second fixing member of the casing or the second fixing member of the optical fiber connector, such that the relative position between the protecting cover and the optical fiber connector is further fixed to prevent the optical fiber cable from being accidentally unplugged. In addition, the invention provides an optical fiber connector, in which the first engaging member is directly disposed on the optical fiber connector and located besides the connecting port, such that the second engaging member of the protecting cover is movably engaged with the optical fiber connector. In circumstances that the optical fiber connector is assembled to the casings of different electronic devices, each casing only has to reserve an opening for accommodating the optical fiber connector, without additionally manufacturing first engaging members separately for each casing, which contributes to more convenience in manufacturing and assembly.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9 is a schematic diagram illustrating that the optical fiber cable is inserted into the electronic device of FIG. 1, and the protecting cover is located at the third position.

FIG. 10 is a schematic partial diagram illustrating the protecting cover of FIG. 9 being hidden.

DESCRIPTION OF EMBODIMENTS

Figure 1:
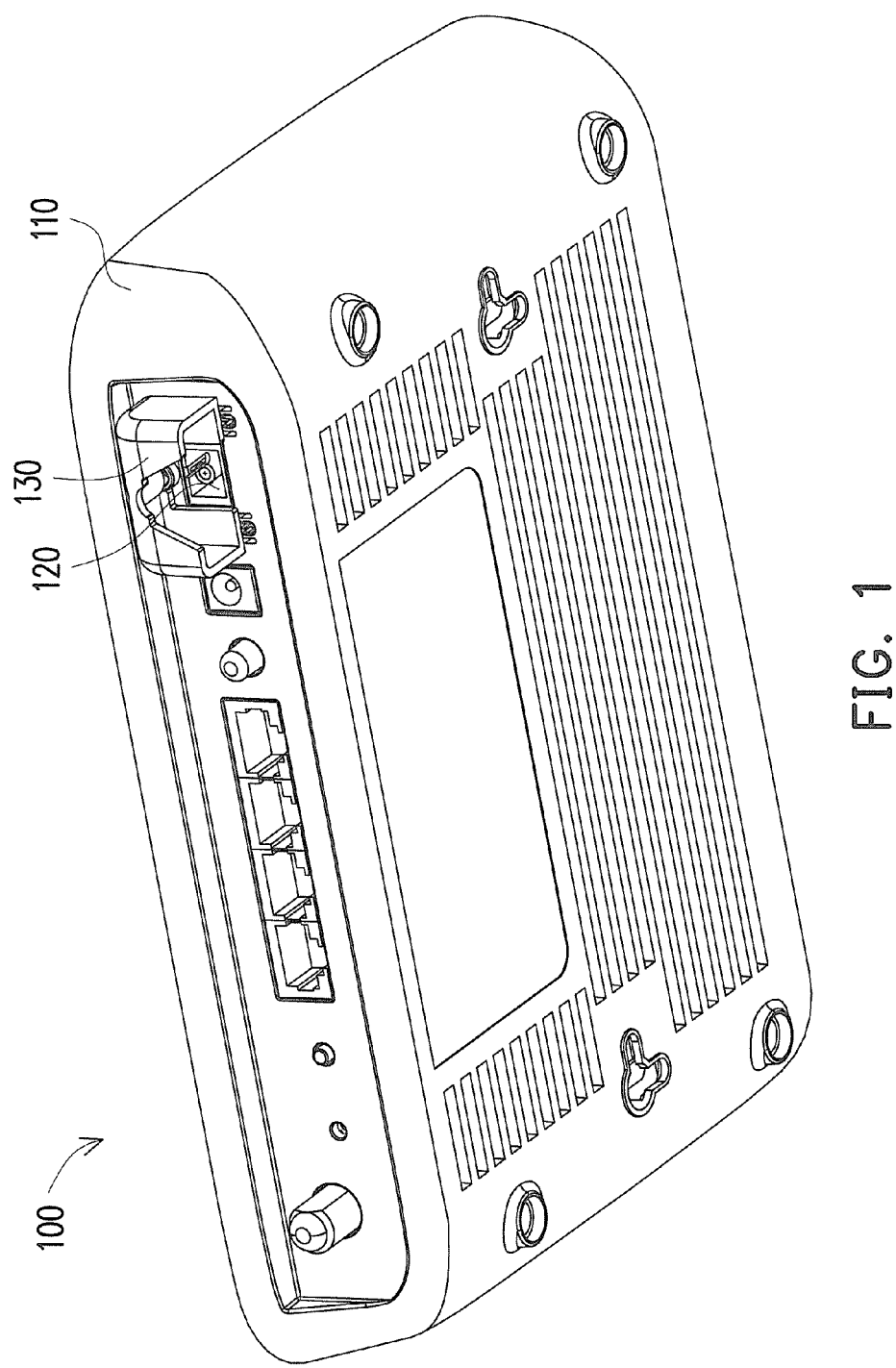
FIG. 1 is a schematic diagram illustrating an electronic device according to an embodiment of the invention.
Figure 2:
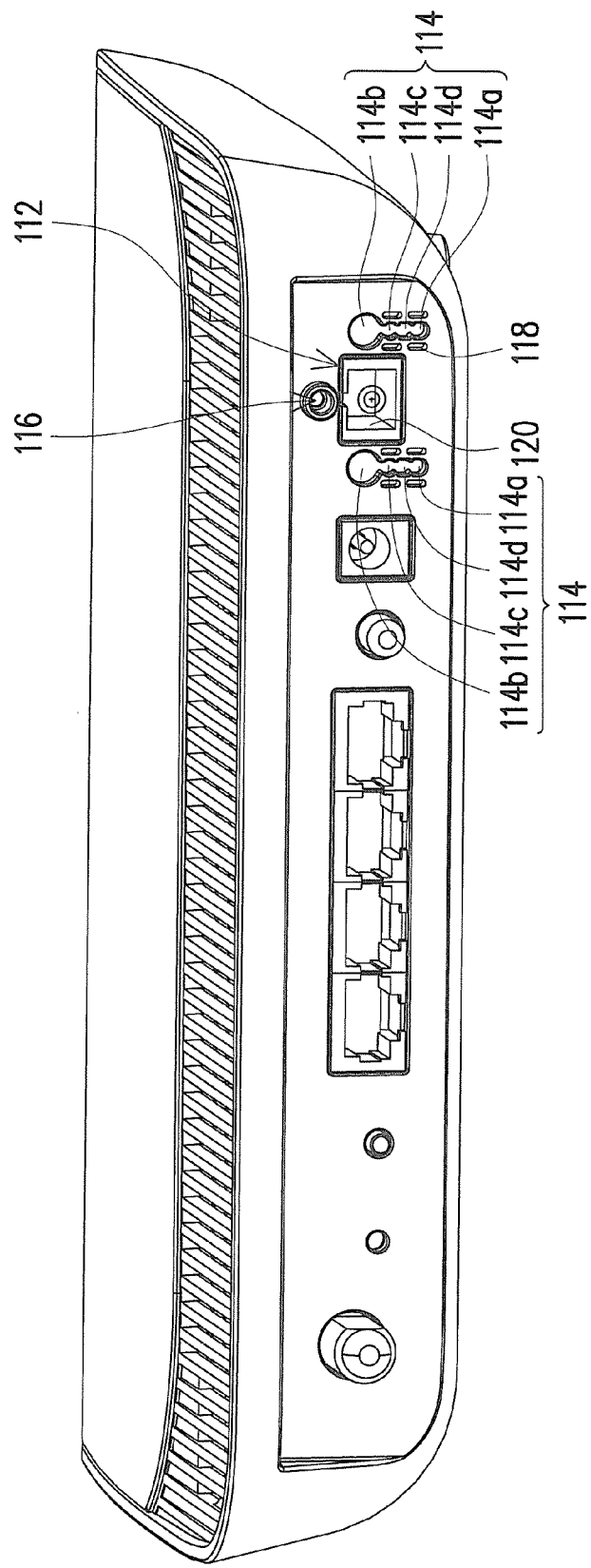
FIG. 2 is a schematic diagram illustrating the electronic device and the optical fiber connector of FIG. 1.
Figure 3:
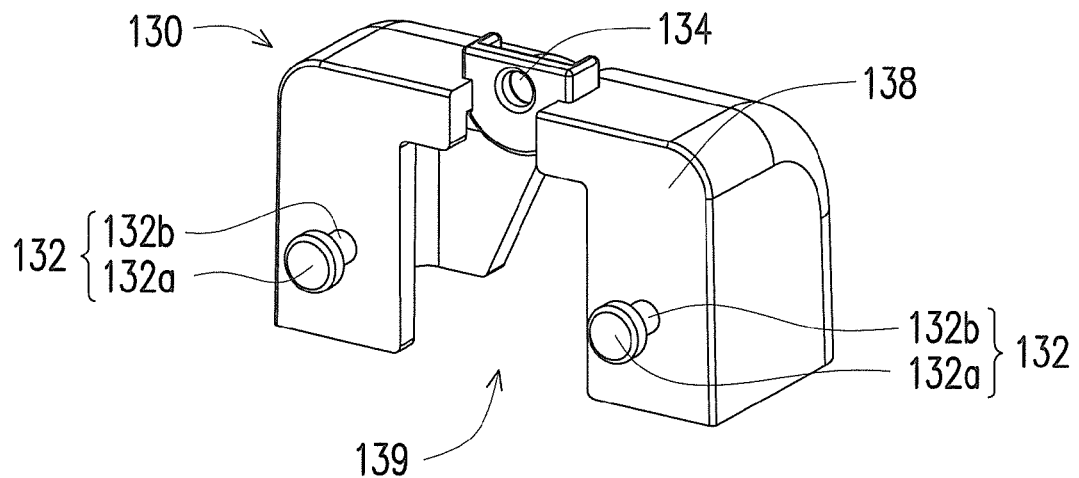
FIG. 3 through FIG. 4 are schematic diagrams illustrating the protecting cover of the electronic device of FIG. 1 in different view angels.
Figure 4:
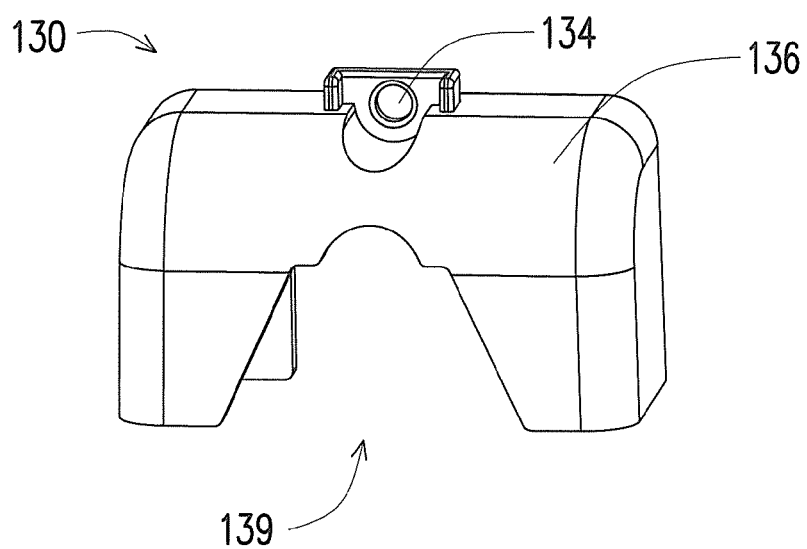

FIG. 1 is a schematic diagram illustrating an electronic device according to an embodiment of the invention. FIG. 2 is a schematic diagram illustrating the electronic device and the optical fiber connector of FIG. 1. FIG. 3 through FIG. 4 are schematic diagrams illustrating the protecting cover of the electronic device of FIG. 1 in different view angels.

With reference to FIG. 1 and FIG. 4, an electronic device 100 of the present embodiment includes a casing 110; an optical fiber connector 120 and a protecting cover 130. The optical fiber connector 120 is commonly known as a Fiber Flange. The electronic device 100 may be an optical fiber router or any other electronic device having an optical fiber connector. The optical fiber connector 120 is disposed in the electronic device and located in an opening 112 of the electronic device. The protecting cover 130 is disposed on the casing 110 of the electronic device. The protecting cover 130 is movably disposed on the casing 110 of the electronic device. When the optical fiber connector 120 is not connected with an optical fiber cable, the protecting cover 130 may shield the optical fiber connector 120 to prevent a light which is emitted from the optical fiber connector 120 from being exposed outward and contributes to a dustproof effect. When the optical fiber connector 120 is connected with the optical fiber cable 10, the protecting cover 130 may move to a position above the opening 112. Thereby, the optical fiber cable 10 is assembled with the optical fiber connector 120 while the optical fiber cable 10 is inserted into the optical fiber connector 120 through the protecting cover 130, such that the optical fiber cable 10 may be fixed firmly. Each of the elements will be introduced in detail below.

Referring to FIG. 2, the casing 110 includes an opening 112, a plurality of first engaging members 114, a second fixing member 116 and a plurality of buffer holes 118. The optical fiber connector 120 is disposed in the opening 112 of the casing and located inside the electronic device 100. In the present embodiment, the casing 110 has two first engaging members 114 respectively located at two sides of the opening 112. In the present embodiment, the first engaging members 114 are designed in a form of rails. Each of the first engaging members 114 includes a first section 114a located in the bottom, a second section 114b located on 1 the top and a third section 114c located between the first section 114a and the second section 114b. A diameter of the second section 114b is greater than a diameter of the first section 114a and greater than a diameter of the third section 114c. The second fixing member 116 is disposed above the opening 112, which may be an opening with an inner thread or may be designed as a screw hole. The buffer holes 118 are disposed at two sides of each first engaging member 114. Referring to FIG. 2, the buffer holes 118 are also disposed on the casing 110, which may be long-narrow, circular, elliptic holes or in any other shape.

The protecting cover 130 is designed on the exterior of the casing 110. In the present embodiment, the protecting cover 130 may include at least one protruding second engaging member 132. Referring to FIG. 3 through FIG. 4, the protecting cover 130 includes two second engaging members 132, and a distance between the second engaging members 132 is corresponding to a distance between the first engaging members 114 of the casing 110 and positions thereof. Each second engaging member 132 is a guiding post and includes a body 132b, an end portion 132a connected with the body 132b and a diameter of the end portion 132a is greater than a diameter of the body 132b. The protecting cover 130 has an outer surface 136 and an inner surface 138 which are opposite to each other and a recess 139 penetrating through the outer surface and the inner surface. The second engaging member 132 is located on the inner surface 138 of the protecting cover 130. In the present embodiment, the protecting cover 130 presents a symmetrical shape at two sides of the recess 139, and partial contour of the outer surface of the protecting cover 130 presents a part of an arc shape to correspond to the outer contour of the optical fiber cable.

Referring both FIG. 2 and FIG. 3, in the present embodiment, the diameter of the second section 114b of the first engaging member 114 is greater than the diameter of the end portion 132a of the second engaging member 132, and the diameter of the end portion 132a of the second engaging member 132 is greater than the diameters of the first section 114a and the third section 114c of the first engaging member 114. The diameters of the first section 114a and the third section 114c of the first engaging member 114 are greater than the diameter of the body 132b of the second engaging member 132, and part of a diameter of a connection area between the first section 114a and the third section 114c and part of a diameter of a connection area between the second section 114b and the third section 114c are slightly smaller than the diameter of the body 132b of the second engaging member 132.

In other words, the second engaging member 132 may penetrate through the second section 114b of the first engaging member 114. Thereafter, the body 132b of the second engaging member 132 may be held in each connection area since part of the diameter of the connection area between the first section 114a and the third section 114c and part of the diameter of the connection area between the second section 114b and the third section 114c are slightly smaller than the diameter of the body 132b of the second engaging member 132. However, the casing 110 and the protecting cover 130 are made of a material with slight extensibility, such as nylon, alkyl benzene sulfonate (ABS), polymethacrylate (PMMA), polyacetal (POM) or the like, and therefore, when a user applies a force to pull down the protecting cover 130, the first engaging members 114 (i.e., the rails) may be slightly deformed, such that the second engaging member 132 moves to the first section 114a or the third section 114c of the first engaging member 114 and drives the protecting cover 130 to move upward and downward on the exterior of the casing.

Additionally, in the present embodiment, the buffer holes 118 are disposed at two sides of each first engaging member 114. The buffer hole 118 may facilitate in providing smaller strength for a part of the casing 110 which are adjacent to the first section 114a and the third section 114c. Thereby, the part of the casing 110 surrounding the first section 114a and the third section 114c has greater extensibility, such that the protecting cover 130 can smoothly move upward and downward on the exterior of the casing 110 by means of the second engaging member 132 and the first engaging member 114.

In the present embodiment, the second engaging members 132 may move relatively to the first engaging members 114, such that the protecting cover 130 may expose or shield the optical fiber connector 120, which will be described in detail below.

Figures 5, 6:
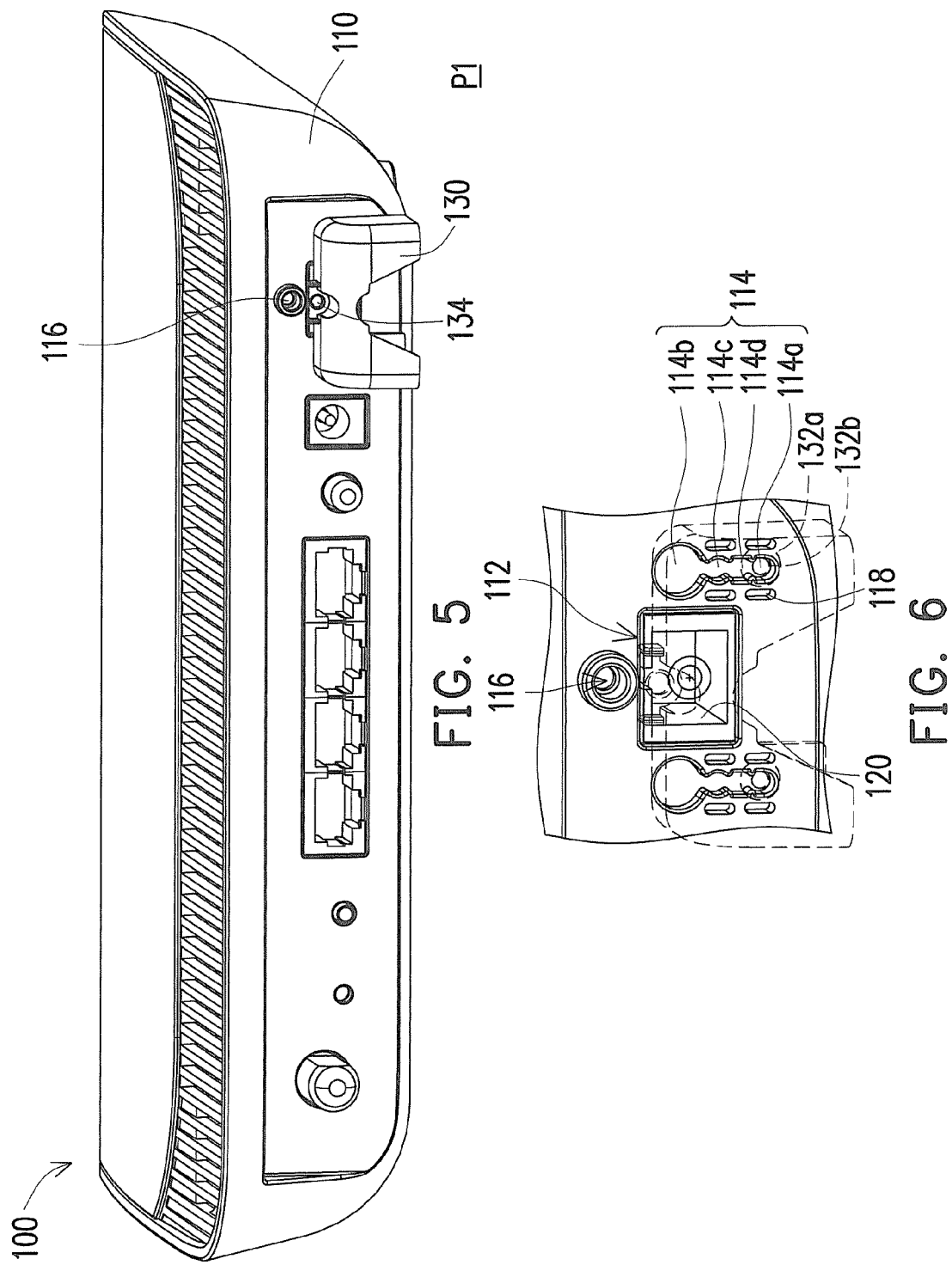
FIG. 5 is a schematic diagram illustrating the protecting cover of the electronic device of FIG. 1 located at the first position.
FIG. 6 is a schematic partial diagram illustrating the protecting cover of FIG. 5 being hidden.

FIG. 5 is a schematic diagram illustrating the protecting cover of the electronic device of FIG. 1 located at the first position. FIG. 6 is a schematic partial diagram illustrating the protecting cover of FIG. 5 being hidden. With reference to FIG. 5 and FIG. 6, in a scenario where the optical fiber connector 120 is not yet connected with the optical fiber cable, the protecting cover 130 may be located at a first position P1 relative to the optical fiber connector 120. Referring to FIG. 6, the second engaging member 132 is located in the first section 114a on the bottom of the first engaging member 114, such that the protecting cover 130 is located at the lowest position to shield the optical fiber connector 120. In this way, the protecting cover 130 may shield the light emitted from the optical fiber connector 120 and prevent the light from being emitted out of the casing 110.

Figures 7, 8:
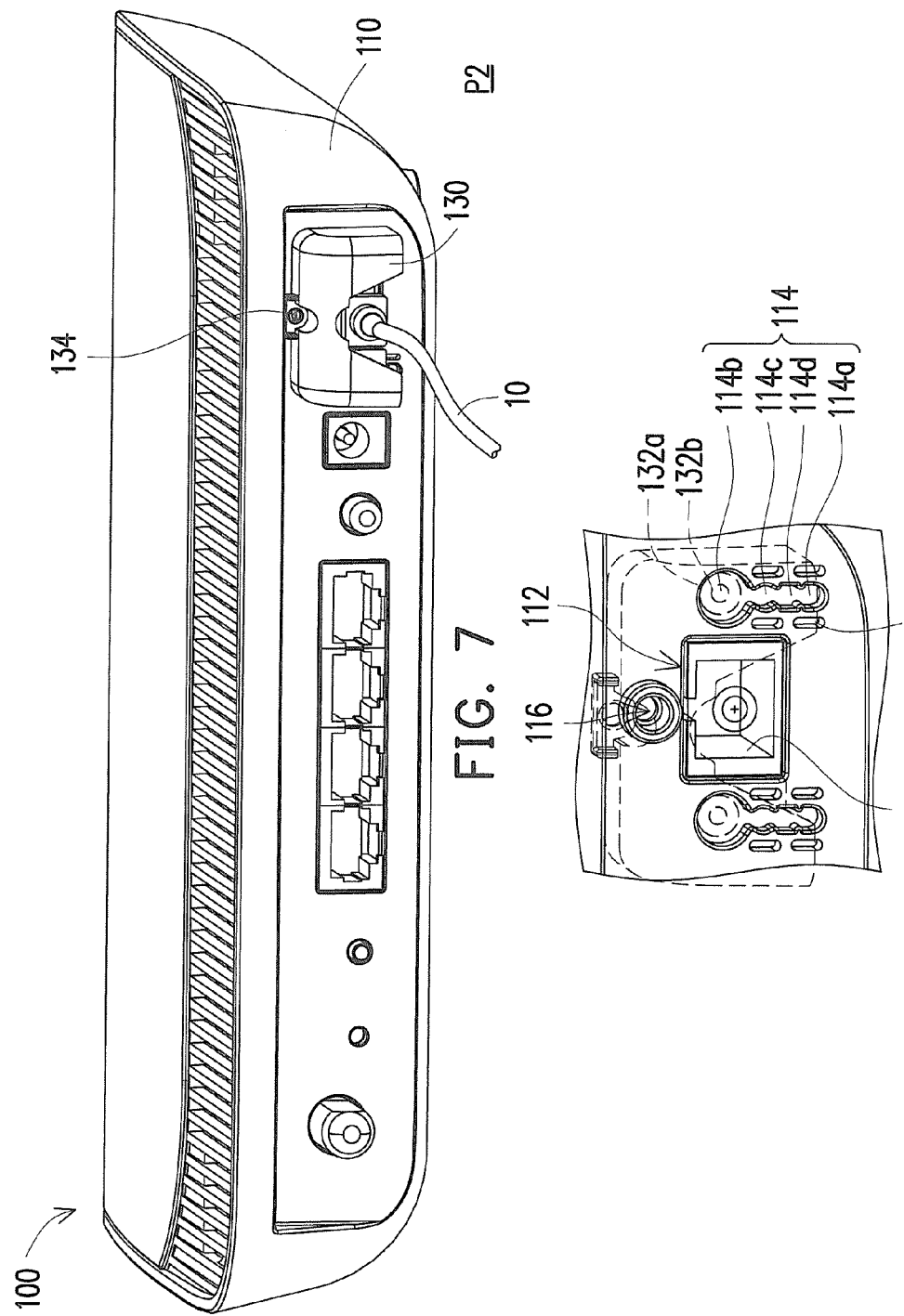
FIG. 7 is a schematic diagram illustrating that the optical fiber cable is inserted into the electronic device of FIG. 1, and the protecting cover is located at the second position.
FIG. 8 is a schematic partial diagram illustrating the protecting cover of FIG. 7 being hidden.

In a scenario where the user is about to insert the optical fiber cable 10 into the optical fiber connector, FIG. 7 is a schematic diagram illustrating that the optical fiber cable 10 is inserted into the electronic device 100, and the protecting cover 130 is located at the second position, and FIG. 8 is a schematic partial diagram illustrating the protecting cover of FIG. 7 being hidden. With reference to FIG. 7 and FIG. 8, the optical fiber connector 120 may be exposed from the recess 139 of the protecting cover 130 just by moving the protecting cover 130 to a second position P2 relative to the casing 110. Namely, the second engaging member 132 is located in the second section 114b on the top of the first engaging member 114, such that the optical fiber connector 120 is exposed from the recess 139 of the protecting cover 130. In this state, the optical fiber cable 10 may be inserted into the optical fiber connector 120, as shown in FIG. 7.

When the optical fiber cable 10 is connected with the optical fiber connector 120, the protecting cover 130 may stays at the second position P2 relative to the casing 110. Alternatively, the protecting cover 130 may also move relatively to the casing 110 to a third position P3.

FIG. 9 is a schematic diagram illustrating that the optical fiber cable is inserted into the electronic device of FIG. 1, and the protecting cover 130 is located at the third position. FIG. 10 is a schematic partial diagram illustrating the protecting cover of FIG. 9 being hidden. With reference to FIG. 9 and FIG. 10, in the present embodiment, when the optical fiber cable 10 is connected with the optical fiber connector 120, the protecting cover 130 may be located at the third position P3 relative to the casing 110, i.e., the second engaging member 132 may be located in the third section 114c adjacent to the middle of the first engaging member 114 to prevent the optical fiber cable 10 from being accidentally unplugged. In this case, part of the optical fiber cable 10 is located between the optical fiber connector 120 and the protecting cover 130. In other words, the protecting cover 130 limits the movement of the optical fiber cable 10, and thereby, the optical fiber cable 10 is fixed to the optical fiber connector 120.

Additionally, the electronic device 100 further includes a first fixing member 140, and the protecting cover 130 includes a through hole 134. In the present embodiment, the first fixing member 140d may be a screw or a copper post, and the second fixing member 116 may be a hole with a thread. When the protecting cover 130 is located at the third position P3, the second engaging member 132 is located in the third section 114c, and the second fixing member 116 coincides with the through hole 134, the first fixing member 140 may pass through the through hole 134 and be fixed to the second fixing member 116, such that the relative position between the protecting cover 130 and the optical fiber connector 120 can be further fixed.

In the present embodiment, the contour of the protecting cover 130 corresponds to the contour of the optical fiber cable 10, and thus, when the protecting cover 130 is located at the third position P3 relative to the optical fiber connector 120, the protecting cover 130 may lean against the optical fiber cable 10 to prevent the optical fiber cable 10 from being unplugged.

Additionally, in the present embodiment, a thickness of the protecting cover 130 is about 1.5 mm, which is sufficient to shield the light and provide certain strength, but the thickness of the protecting cover 130 is not limited thereto in the invention. Further, the numbers of the first engaging member 114 and the second engaging member 132 and the relative position between the first engaging member 114 and the second engaging member 132 are not limited to the embodiment above.

It should be mentioned that in the present embodiment, the distance between the first section 114a and the second section 114b and the distance between the first section 114a and the third section 114c have to be sufficient for the protecting cover 130 to completely shield the optical fiber connector 120, expose the optical fiber connector 120 or yield the space to the optical fiber cable 10. Referring to FIG. 2 again, the first engaging member 114 further includes an idle-motion area 114d between the first section 114a and the third section 114c. The idle-motion area 114d has a diameter same as the diameters of the first section 114a and the third section 114b. The second engaging member 132 passes through the idle-motion area 114d whiling moving between the first section 114a and the third section 114c to prevent the connection area between the first section 114a and the third section 114c which is smaller than the diameter of the body 132b of the second engaging member 132 from being too long, which causes difficulty to the second engaging member 132 in moving between the first section 114a and the third section 114c. Certainly, in other embodiments, if a long distance between the first section 114a and the third section 114c is not needed, the idle-motion area 114d may be omitted.

Figure 11:
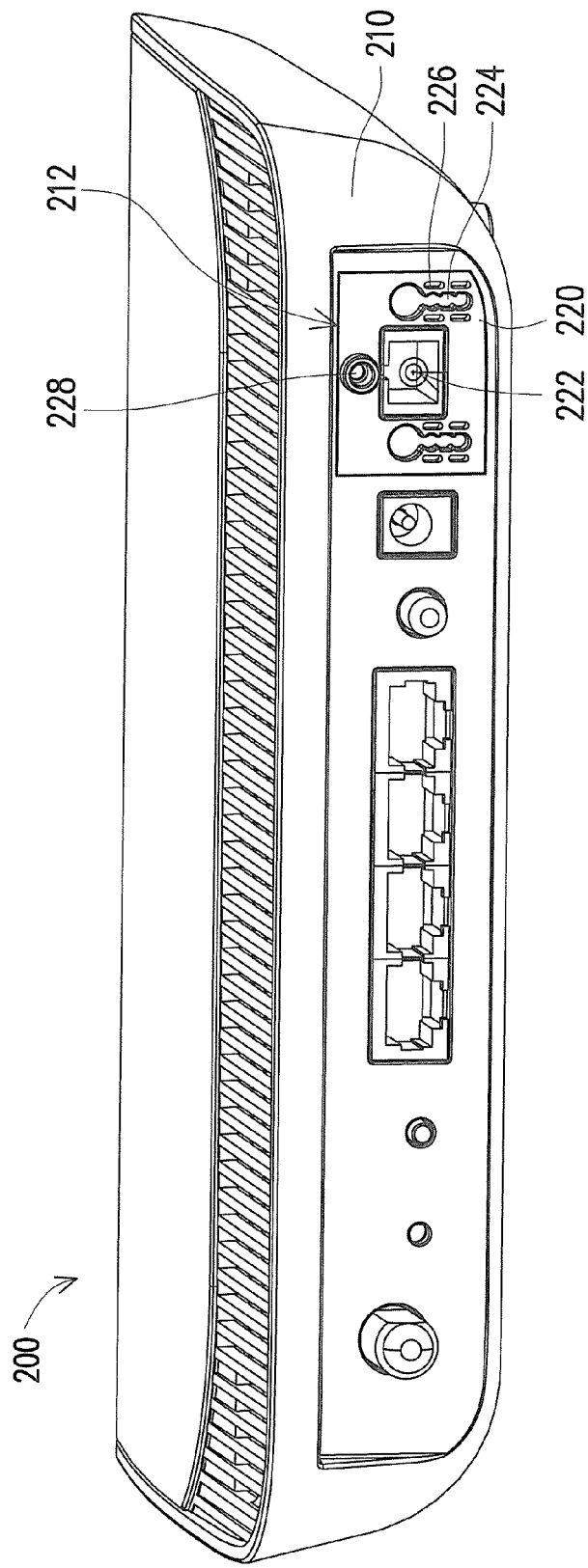
FIG. 11 is a schematic diagram illustrating an optical fiber connector disposed on an electronic device according to an embodiment of the invention.

FIG. 11 is a schematic diagram illustrating an optical fiber connector disposed on an electronic device according to an embodiment of the invention. With reference to FIG. 11, the present embodiment is different from the preceding embodiment in that the optical fiber connector 120 of the preceding embodiment is a commonly known flange, and a size of the opening 112 on the casing 110 is a commonly known size for the optical fiber connector 120, the first engaging member 114 is located in the casing 110, and the protecting cover 130 is disposed on the exterior of the casing 110.

In the present embodiment, an optical fiber connector 220 is also disposed on an electronic device 200, and the optical fiber connector 220 includes not only a connecting port 222 capable of being connected with an optical fiber cable, but also at least one first engaging member 224 and at least one buffer hole 226 located besides the connecting port 222. In other words, the first engaging member 114 and the buffer hole 118 disposed on the casing 110 in the preceding embodiment are changed to be disposed on a wall of the optical fiber connector 220. In the present embodiment, with the first engaging member 224 and the buffer hole 226 directly formed on the optical fiber connector 220, the optical fiber connector 220 can be operated in coordination with the protecting cover only by reserving an opening 212 for exposing the optical fiber connector 220 of the present embodiment when the optical fiber connector 220 is to be assembled to different casings 210, without additionally manufacturing first engaging members and buffer holes separately for the casings, which contributes to more convenience in manufacturing and assembly.

In detail, the optical fiber connector 220 includes a connecting port 222 serving to connect an optical fiber cable (not shown), two first engaging members 224 located at two sides of the connecting port 222 and eight buffer holes 226 located at two sides of the first engaging members 224. The casing 210 of the electronic device 200 includes an opening 212, and a size of the opening 212 corresponds to a size of the optical fiber connector 220 of the present embodiment. Namely, the size of the opening 212 is greater than the size of the opening typically reserved for a flange. The optical fiber connector 220 is disposed in the opening 212.

In the present embodiment, with the second engaging member of the protecting cover movably engaged with the first engaging member 224 of the optical fiber connector 220, the connecting port 222 of the optical fiber connector 220 may be exposed or shielded, or the optical fiber cable is fixed relative to the optical fiber connector 220. Additionally, in the present embodiment, the second fixing member 228 is disposed on the optical fiber connector 220. When the optical fiber cable is inserted into the connecting port 222 of the optical fiber connector 220, a first fixing member (not shown), such as a screw, may pass through the protecting cover and be fixed to the second fixing member 228. Certainly, in other embodiments, the second fixing member 228 may also disposed on the casing 210 to enhance connection strength among the casing 210, the optical fiber connector 220 and the protecting cover.

To sum up, in the electronic device of the invention, the first engaging members are disposed on the casing, and with the protecting cover having the second engaging members movably engaged with the first engaging members, the protecting cover can move upward and downward on the exterior of the casing. In the scenario that the optical fiber cable is not yet inserted into the optical fiber connector, each second engaging member can be located in the first section of each first engaging member (i.e., the protecting cover is located at the first position relative to the connector). In this circumstance, the protecting cover shields the connecting port of the optical fiber connector, such that the user can be prevented from viewing the light. In the scenario that the optical fiber cable is about to be inserted into the optical fiber connector, by means of pushing up the protecting cover, rather than detaching the protecting cover, each second engaging member of the protecting cover can move to the second section of each first engaging member (i.e., the protecting cover is located at the second position relative to the connector), and thereby, the connector is exposed to connect the optical fiber cable. Afterwards, the user can again move second engaging member of the protecting cover to the third section of the first engaging member (i.e., the protecting cover is located at the third position relative to the connector). In this circumstance, part of the optical fiber cable is located between the connector and the protecting cover. That is, the protecting cover interferes the optical fiber cable to prevent the optical fiber cable from being unplugged from the optical fiber connector.

In the electronic device of the invention, the first fixing member, such as a screw or the like, passes through the through hole of the protecting cover and is fixed to the second fixing member of the casing or to the second fixing member of the optical fiber connector, and thereby, the relative position between the protecting cover and the connector can be further fixed to prevent the optical fiber cable from being accidentally unplugged.

Moreover, the invention further provides an optical fiber connector, in which the first engaging members are directly disposed on the optical fiber connector and located besides the connecting port, such that the second engaging members of the protecting cover are movably engaged with the optical fiber connector. In circumstances that the optical fiber connector is to be assembled to casings of different electronic devices, each casing only has to reserve an opening for accommodating the optical fiber connector, without additionally manufacturing first engaging members separately for each casing, which contributes to more convenience in manufacturing and assembly.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electronic device, comprising:
    a casing, comprising an opening and a first engaging member;
    an optical fiber connector, disposed in the opening, and the first engaging member being disposed adjacent to the opening; and
    a protecting cover, comprising a second engaging member movably engaged with the first engaging member of the casing, the protecting cover exposing or shielding the optical fiber connector when moving along the first engaging member.

2. The electronic device according to claim 1, wherein the first engaging member is a rail, the second engaging member is a guiding post extending into the rail, the first engaging member comprises a first section and a second section, the protecting cover shields the optical fiber connector when the second engaging member is located in the first section, and the protecting cover exposes the optical fiber connector when the second engaging member is located in the second section.

3. The electronic device according to claim 2, wherein the first engaging member further comprises a third section located between the first section and the second section, when an optical fiber cable is inserted into the optical fiber connector, the second engaging member is located in the third section, and part of the optical fiber cable is located between the optical fiber connector and the protecting cover.

4. The electronic device according to claim 3, wherein the second engaging member comprises an end portion and a body, a diameter of the second section is greater than a diameter of the end portion, the diameter of the end portion is greater than a diameter of the first section and greater than a diameter of the third section, and the diameters of the first section and the third section are greater than a diameter of the body.

5. The electronic device according to claim 3, further comprising a first fixing member, and the casing further comprising a second fixing member, and the protecting cover comprising a through hole, wherein when the second engaging member is located in the third section, the first fixing member passes through the through hole to be fixed to the second fixing member.

6. The electronic device according to claim 1, wherein the casing further comprises a buffer hole disposed besides the first engaging member.

7. An optical fiber connector, comprising:
    a connecting port, used for an optical fiber cable to be inserted in;
    a first engaging member, located besides the connecting port; and
    a protecting cover, comprising a second engaging member movably engaged with the first engaging member, and the protecting cover exposing or shielding the connecting port when moving along the first engaging member.

8. The optical fiber connector according to claim 7, wherein the first engaging member is a rail, the second engaging member is a guiding post extending into the rail, the first engaging member comprises a first section and a second section, the protecting cover shields the optical fiber connector when the second engaging member is located in the first section, and the protecting cover exposes the optical fiber connector when the second engaging member is located in the second section.

9. The optical fiber connector according to claim 8, wherein the first engaging member further comprises a third section located between the first section and the second section, when an optical fiber cable is inserted into the connecting port of the optical fiber connector, the second engaging member is located in the third section, and part of the optical fiber cable is located between the optical fiber connector and the protecting cover.

10. The optical fiber connector according to claim 9, wherein the second engaging member comprises an end portion and a body, a diameter of the second section is greater than a diameter of the end portion, the diameter of the end portion is greater than a diameter of the first section and greater than a diameter of the third section, and the diameters of the first section and the third section are greater than a diameter of the body.

11. The optical fiber connector according to claim 9, further comprising a first fixing member, and the fiber connector further comprising a second fixing member, and the protecting cover comprising a through hole, wherein when the second engaging member is located in the third section, the first fixing member passes through the through hole to be fixed to the second fixing member.

12. The optical fiber connector according to claim 7, further comprising a buffer hole disposed besides the first engaging member.

* * * * *